United States Patent
Childs et al.

(10) Patent No.: US 10,044,266 B2
(45) Date of Patent: Aug. 7, 2018

(54) PEAK CURRENT SERVO

(71) Applicant: Dialog Semiconductor (UK) Limited, London (GB)

(72) Inventors: Mark Childs, Swindon (GB); Michele DeFazio, Germering (DE); Carsten Barth, Schwaebisch Gmuend (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/701,946

(22) Filed: Sep. 12, 2017

(65) Prior Publication Data
US 2018/0083524 A1  Mar. 22, 2018

(30) Foreign Application Priority Data
Sep. 19, 2016 (DE) .......... 10 2016 217 857

(51) Int. Cl.
*H02M 3/157*  (2006.01)
*H02M 3/158*  (2006.01)
*H02M 1/00*  (2006.01)

(52) U.S. Cl.
CPC ......... *H02M 3/157* (2013.01); *H02M 3/1588* (2013.01); *H02M 2001/0009* (2013.01); *H02M 2001/0025* (2013.01)

(58) Field of Classification Search
CPC ........ H02M 3/156–3/1588; H02M 2001/0009; H02M 2001/0025; H02M 323/271; H02M 323/282; Y02B 70/1466; G01R 19/0092; G05F 1/462; H02H 3/087
See application file for complete search history.

(56) References Cited

U.S. PATENT DOCUMENTS

| | | | |
|---|---|---|---|
| 5,528,132 A | 6/1996 | Doluca | |
| 5,747,976 A | 5/1998 | Wong et al. | |
| 6,166,528 A | 12/2000 | Rossetti et al. | |
| 6,803,750 B2 | 10/2004 | Zhang | |
| 7,107,468 B2 | 9/2006 | Pullen et al. | |

(Continued)

OTHER PUBLICATIONS

Co-pending U.S. Appl. No. 15/175,301, filed Jun. 7, 2016, "Dynamic Clock Divide for Current Boosting," 21 pgs. By Mark Childs et al.

(Continued)

*Primary Examiner* — Kyle J Moody
*Assistant Examiner* — Peter Novak
(74) *Attorney, Agent, or Firm* — Saile Ackerman LLC; Stephen B. Ackerman (57) ABSTRACT

The proposed disclosure combines peak-mode monitoring with valley-mode control, in a Buck switching converter, by means of a peak-current sampling circuit, not to turn the high side device off, but to control a slow loop, which in turn controls a variable offset incorporated into the loop control current. This helps the loop control current define the exact peak current, regardless of what other offsets, compensation ramp or peak-to-peak current ripple, are applied to the loop control current. The peak current is determined by an operational transconductance amplifier (OTA), whose maximum current is clamped to a programmed value. The loop control current is most likely implemented using a digital successive approximation register (SAR) system, but may also be implemented using a slow analog control loop.

18 Claims, 9 Drawing Sheets

(56) References Cited

U.S. PATENT DOCUMENTS

| | | |
|---|---|---|
| 7,541,794 B2 | 6/2009 | Tabaian et al. |
| 7,791,321 B2 | 9/2010 | Xu et al. |
| 8,519,691 B2 | 8/2013 | McCloy-Stevens |
| 8,754,623 B2 | 6/2014 | Huang et al. |
| 9,768,688 B2 | 9/2017 | Repton et al. |
| 2008/0024104 A1 | 1/2008 | Yamada |
| 2011/0018549 A1* | 1/2011 | Hashimoto ........ G01R 31/2839 324/537 |
| 2013/0051107 A1 | 2/2013 | Rettig et al. |
| 2014/0070781 A1* | 3/2014 | Yanagida ................ G05F 1/10 323/271 |
| 2014/0139198 A1* | 5/2014 | Manlove ............... H02M 3/156 323/282 |
| 2015/0097542 A1 | 4/2015 | Repton et al. |

OTHER PUBLICATIONS

Co-pending U.S. Appl. No. 62/173,454, filed Jun. 20, 2015, "Dynamic Clock Divide for Current Boosting," 21 21 pgs., by Mark Childs et al.

Co-pending U.S. Appl. No. 15/189,210, filed Jun. 22, 2016, "Hybrid Buck," by Mark Childs, 24 pgs.

Co-pending U.S. Appl. No. 15/214,821, filed Jul. 20, 2016, "Regulation of a Multiple Stage Switch Mode Power Converter Through an Intermediate Voltage Control," by Mark Childs, 48 pgs.

\* cited by examiner

PEAK CURRENT SERVO

RELATED PATENT APPLICATIONS

This application is related to U.S. patent application Ser. No. 15/189,210, filed on Jun. 22, 2016, assigned to the same assignee as the present invention, and incorporated herein by reference in its entirety.

BACKGROUND OF THE INVENTION

Field of the Invention

The disclosure relates generally to Buck, Boost, and other types of DC-DC switching power converters, operating in peak-mode and valley-mode current control.

DESCRIPTION OF RELATED ART

A direct peak-mode control loop is commonly used in Buck switching converters. In this type of system, the PMOS peak current limit is controlled and proportional to the voltage error at the Buck output. This scheme is then compensated against sub-harmonic oscillation, by subtracting a fixed compensation ramp from the peak current limit over each cycle. To implement a fixed current limit, for over-current protection, a high clamp level is needed, above which the peak current limit is not allowed to rise.

Figure 1:
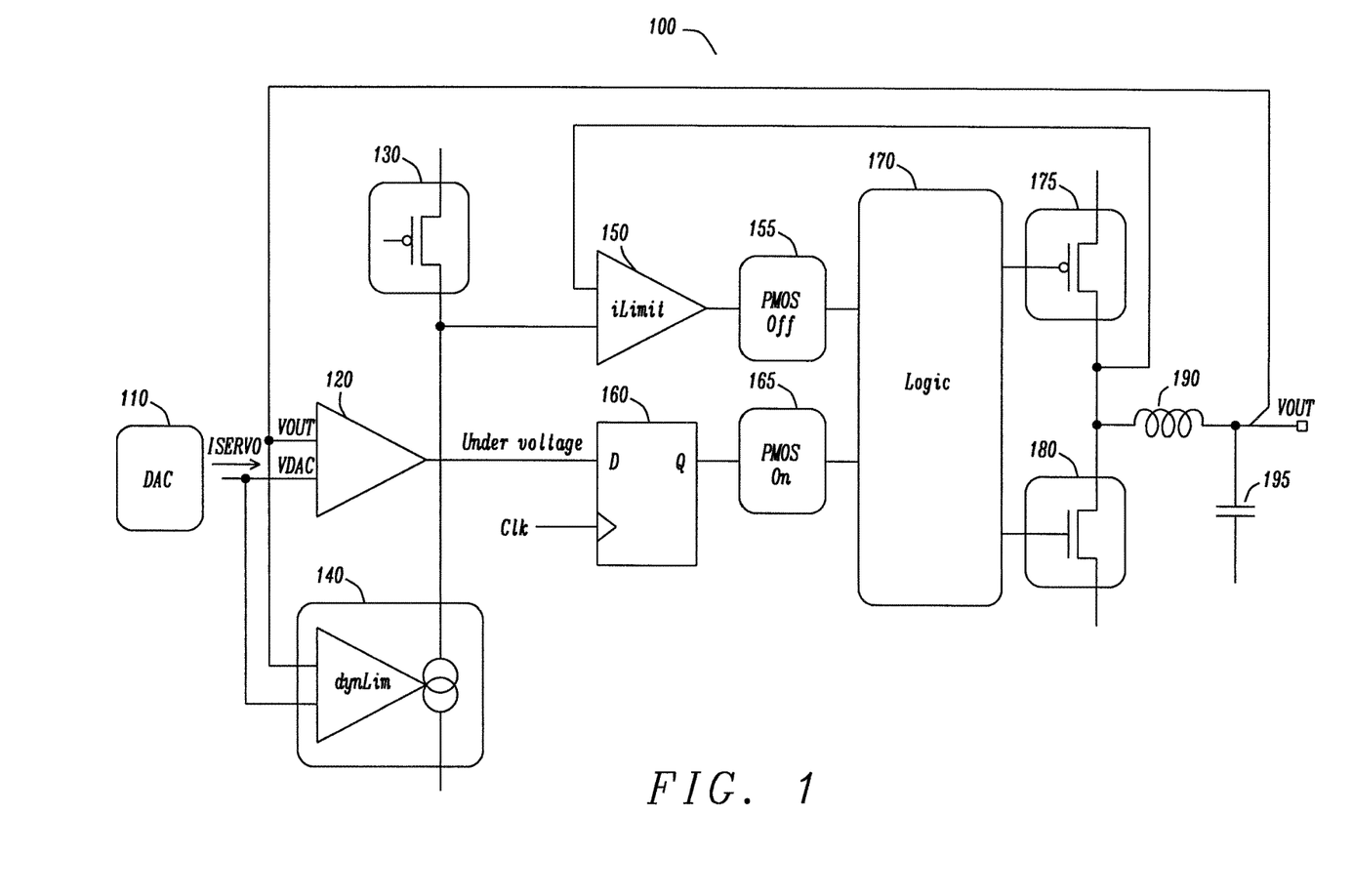
FIG. 1 is a circuit diagram illustrating a peak current mode Buck switching converter, where the peak PMOS current limit is proportional to the output voltage error.

FIG. 1 is circuit diagram 100, which illustrates a peak current mode Buck switching converter, where peak PMOS current limit 130 is proportional to the output voltage error. High side device 175 is turned on with controls 165, through logic 170, each cycle by the clock. The high side device is then turned off with controls 155, by current limit 150. When the high side device is turned off, low side device 180 is turned on through logic 170, each cycle by the clock. The current limit is controlled by operational transconductance amplifier (OTA) 140, and a comparison of the buck target voltage VDAC, from DAC 110, with the output voltage VOUT, across capacitor 195. OTA current limit 140, programmed to a maximum value, serves to control the peak coil current, through inductor 190. Under-voltage comparator 120 provides pulse skipping to the clock in latch 160, when the load is very low.

Figure 2A:
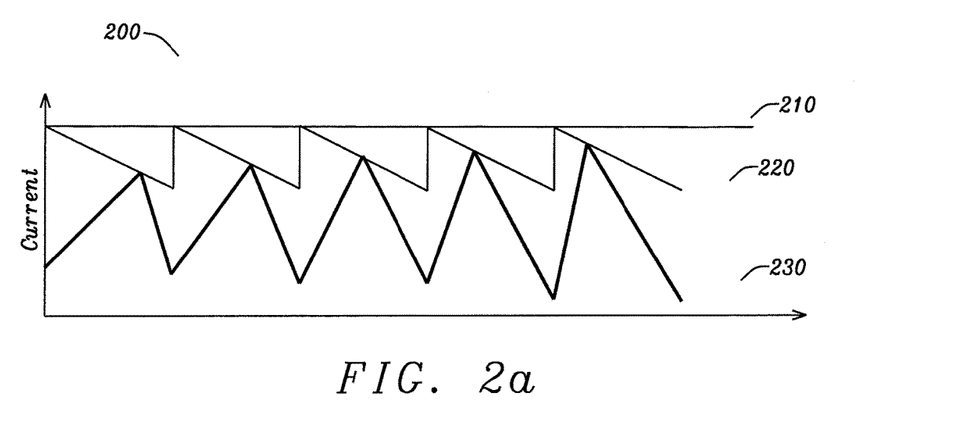
FIG. 2a is a signal diagram illustrating a Buck switching converter operating in peak-mode control, where the peak high side device current limit is proportional to the output voltage error, and a fixed compensation ramp is subtracted from the current limit over each cycle.

FIG. 2a is signal diagram 200 illustrating a Buck switching converter operating in peak-mode control, where the peak PMOS current limit is proportional to the output voltage error, and a fixed compensation ramp is subtracted from the current limit over each cycle. The maximum peak current limit is indicated in 210 as determined by an operational transconductance amplifier (OTA) programmed to a maximum value. The compensation ramp is subtracted from this maximum limit each cycle, producing the actual peak current limit indicated in 220. On the left of signal diagram 200, the duty-cycle is high and the high side device on time is long. By the time the coil current reaches the actual limit, the compensation ramp has reduced the current limit substantially from the maximum limit. The resultant coil current 230 achieved is therefore lower. On the right of signal diagram 200, the duty-cycle is low and the high side device on time is short. Now the resultant coil current intersects with the actual limit and the compensation ramp has had less effect. The resultant coil current 230 achieved is therefore higher. The compensation ramp acts to reduce the overall current limit, and the actual peak current limit 220 varies depending on the duty cycle.

At higher switching frequencies, a valley-mode control loop may be more attractive in Buck switching converters. The low side device is switched on by the clock, and switched off by the coil valley current. The valley current is controlled and proportional to the output voltage error. To compensate a valley-mode control loop against sub-harmonic oscillation, it is necessary to add a fixed compensation ramp to the control current each cycle, and the compensation used is higher than in peak-mode switching converters.

Figure 2B:
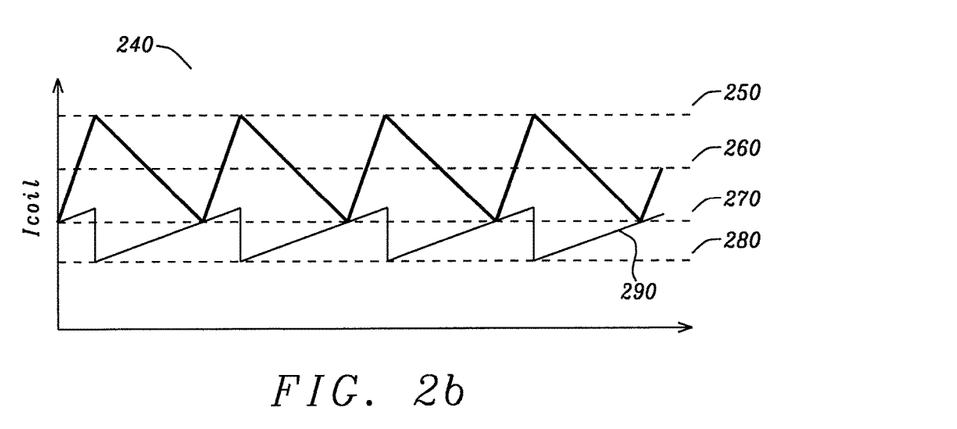
FIG. 2b is a signal diagram illustrating a Buck switching converter operating in valley-mode control, where the low side device current limit is proportional to the output voltage error, and a fixed compensation ramp is added to the current limit over each cycle.

FIG. 2b is signal diagram 240 illustrating a Buck switching converter operating in valley-mode control, where low side device current limit 250 is proportional to the output voltage error, and fixed compensation ramp is added to the current limit over each cycle. The OTA current defines minimum valley-mode current 280 allowed, and actual current limit is not achieved. Instead, compensation ramp 290 adds to the OTA current, and minimum valley-mode current 270 produced is higher. To achieve zero mean current 260 in the coil, the OTA current would already have had to be negative, without compensation. The effect of the compensation current is to move the OTA even further negative. As the OTA current will eventually have to be strongly positive, when the load current is high, it is easier to regulate the current only in the positive domain.

SUMMARY OF THE INVENTION

An object of this disclosure is to implement a Buck, Boost, or other switching converter with a peak current servo, to improve peak current limit accuracy in peak-mode switching converters.

Further, another object of this disclosure is to remove output current offset in valley-mode switching converters.

Still further, another object of this disclosure is to implement a peak current limit in valley-mode switching converters.

To accomplish the above and other objects, a peak current servo circuit is disclosed, having a sampling circuit and control loop, configured to sample the peak high side device current just before the point when the high side device switches off. A comparator is configured to compare a sample with a reference value, during a low side device on time. A control loop counter is configured to successively increment or decrement a stored value based on the output of a comparator. A matched PMOS is configured to supply a current for a reference value.

The above and other objects are further achieved by a method for peak-mode monitoring with valley-mode control, in a peak current servo circuit. The steps include providing a Buck, Boost, or other switching converter with a peak current servo, consisting of high side and low side devices for a switching converter, a sampling circuit and control loop, sampling the peak high side device current, just before the point when the high side device switches off. A comparator is provided, comparing the sampled value with a reference value, determining if the sampled value is larger or smaller than the reference value, during the low side device on time. A control loop counter is provided, successively incrementing or decrementing a stored value based on the output of the comparator. An offset signal is provided in the control loop, shifting the coil current waveform up or down, matching the peak coil current achieved to the reference current, in cycles to come.

In various embodiments, the function may be achieved by implementing an operational transconductance amplifier (OTA), whose maximum current is clamped to a programmed value, ensuring the peak coil current is unable to exceed this maximum.

In various embodiments, the function may be achieved implementing a PMOS high side device and an NMOS low side device.

DETAILED DESCRIPTION OF THE INVENTION

One problem with a direct peak-mode control loop is that the peak current limit accuracy is impacted by the compensation ramp, and the compensation ramp acts to reduce the overall current limit. Therefore the actual peak current limit may vary depending on the duty-cycle. If the duty-cycle is high, the compensation ramp erodes the maximum peak current limit, and the resultant coil current value will fall. If the duty-cycle is low, then the actual peak current limit will be very close to the maximum clamp value in the controller, and the resultant coil current value will rise. The disclosure proposes to improve the peak current limit accuracy in a peak-mode switching converter.

In a valley-mode switching converter, the compensation ramp rate is much higher than in peak-mode switching converters, and the amount of offset introduced is non-negligible. The disclosure proposes to remove the offset in order to keep the control point of the switching converter in the correct region, and avoid negative control currents, in a valley-mode switching converter.

In addition, for a valley-mode switching converter, the control loop directly sets the minimum valley-mode current. A typical protection feature in a Buck switching converter is peak-mode current limit, to prevent the instantaneous coil current from exceeding the saturation current of the inductor. The valley-mode control loop has no knowledge of the high side device current, and the peak current in the coil is not naturally limited. At higher switching frequencies, the on time of the high side device is typically too short to accurately measure the current, detect when it rises above a threshold value, and take action. It may take several tens of nanoseconds for a current measurement to settle and for a high side device turn-off signal to propagate through the switching converter logic. The disclosure proposes to implement a peak current limit in a valley-mode switching converter.

To implement a current limit in valley-mode requires that the maximum valley current is limited. This then means the maximum peak current is also limited. However, as the peak current limit is dependent on operating conditions, the exact maximum valley current for a given maximum peak current is not accurately known. It is therefore necessary to set the maximum valley current much lower than would the case at typical conditions, to allow for the variation over operating conditions. If the peak high side device current could be measured, then the maximum valley-mode current could be set much more accurately, and the maximum output current of the Buck switching converter optimized.

It may be beneficial to mix both peak-mode and valley-mode phases in the same switching converter. If this scheme is used, it is necessary to match the peak-mode and valley-mode currents. The peak-mode coil currents are naturally entirely below the peak-mode control current, whereas the valley-mode coil currents are entirely above the valley-mode control current. If an offset is applied to the valley-mode control current, the coil currents of all phases are matched. The disclosure in related patent application Ser. No. 15/189,210 makes possible a hybrid buck, where peak-mode phases are used alongside valley-mode phases, and controlled by the same OTA current limit. The OTA current would then control the minimum coil current of the valley-mode phases, and the maximum coil current of the peak-mode phases. The peak current servo of the disclosure serves to move the offset of the peak-mode current down and of the valley-mode current up.

Figure 3A:
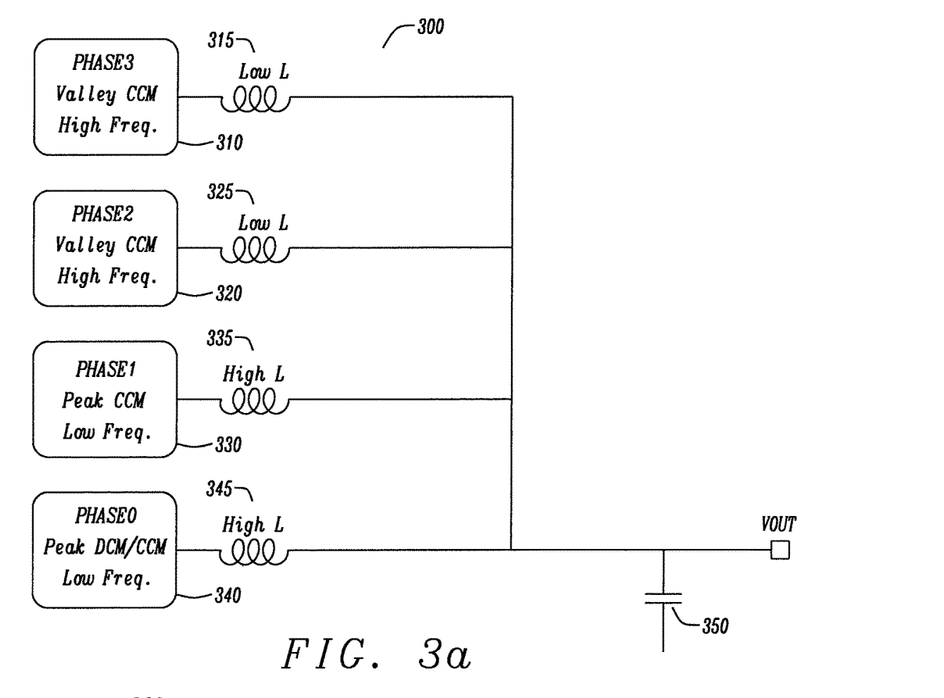
FIG. 3a is a block diagram illustrating a Hybrid Buck switching converter, using both peak-mode and valley-mode current phases.

FIG. 3a is block diagram 300 illustrating a Hybrid Buck switching converter, using both peak-mode and valley-mode current phases. A master phase0 340 is defined, which will operate at low loads. This master phase will use peak-mode control and support discontinuous mode operation. A slave phase1 330 is defined, with inductor 335, which will operate at high loads. This slave phase will not support DCM, but will operate only in continuous conduction mode. The master phase would then typically use a much lower switching frequency, and a much larger and higher value inductor 345. The slave phases phase2 320 and phase3 310 would then typically use a much higher switching frequencies and much smaller value inductors 325 and 315, respectively.

This simplifies the valley-mode phase design substantially, and the output voltage VOUT is stored across capacitor 350, as disclosed in related patent application Ser. No. 15/189, 210.

There is no limit to how many master and slave phases may be defined. Multiple master phases may operate at different frequencies and with different coil values. Multiple slave phases may operate at different frequencies and with different coil values. Not all peak mode phases must support DCM operation, but at least one should.

Figure 3B:
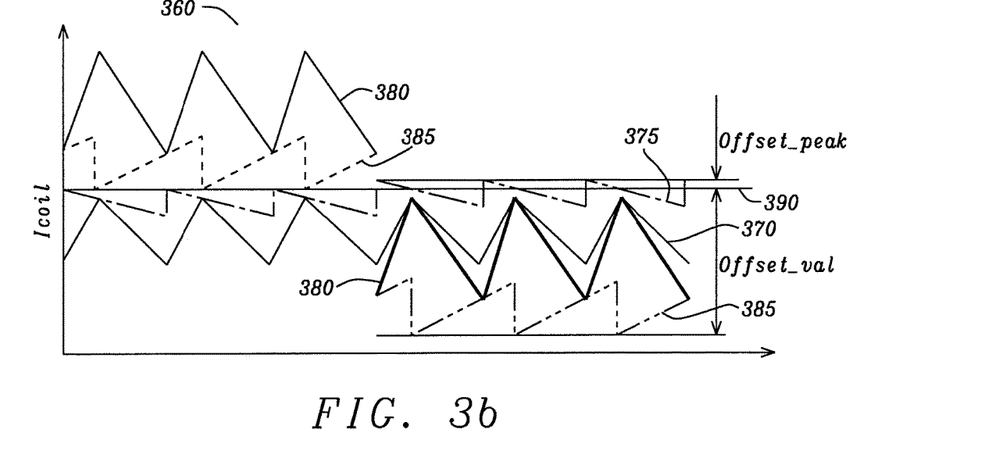
FIG. 3b is a signal diagram illustrating a Buck switching converter operating with a mix of peak-mode and valley-mode phases.

FIG. 3b is signal diagram 360 illustrating a Buck switching converter operating with a mix of peak-mode and valley-mode phases, where a better operating condition is illustrated on the right. On the left of the signal diagram, the coil currents are defined by OTA target current 390, and compensation ramps 375 and 385, for peak-mode and valley-mode phases respectively. Peak coil current 370 of the peak-mode phase is below the OTA target current, and valley coil current 380 of the valley-mode phase is above the OTA target current. The coil currents do not intersect at all. A better operating condition is shown on the right, where valley-mode current 380 has been offset to match peak coil current with that of peak-mode current 370, as disclosed in related patent application Ser. No. 15/189,210.

A direct peak-mode control loop determines peak current by using the high side device current limit, controlling the maximum current in the high side device, and therefore the peak inductor current. A clock controls the turn on time of the high side device, and a compensation ramp is used in the loop to prevent sub-harmonic oscillation. The direct peak-mode system is limited in frequency by the high side device current limit, which takes time to settle before a valid current limit is obtained. The comparator operation and control logic need to be performed during the same high side device on time. The disclosure proposes a sampling circuit that doesn't require switching converter reaction within the high side device on time.

To implement a peak current limit in a valley-mode switching converter, the low side device is turned on with a clock edge, and the current in the low side device is monitored. When the current falls beneath the low side device current limit, the low side device is turned off and the high side device is turned on. The high side device is then turned off with the next clock edge, and the low side device turned back on again. Because the low side device is on for a significantly longer time than the high side device, the current is sampled during the low side device on time, allowing for higher switching converter frequencies.

Figure 4A:
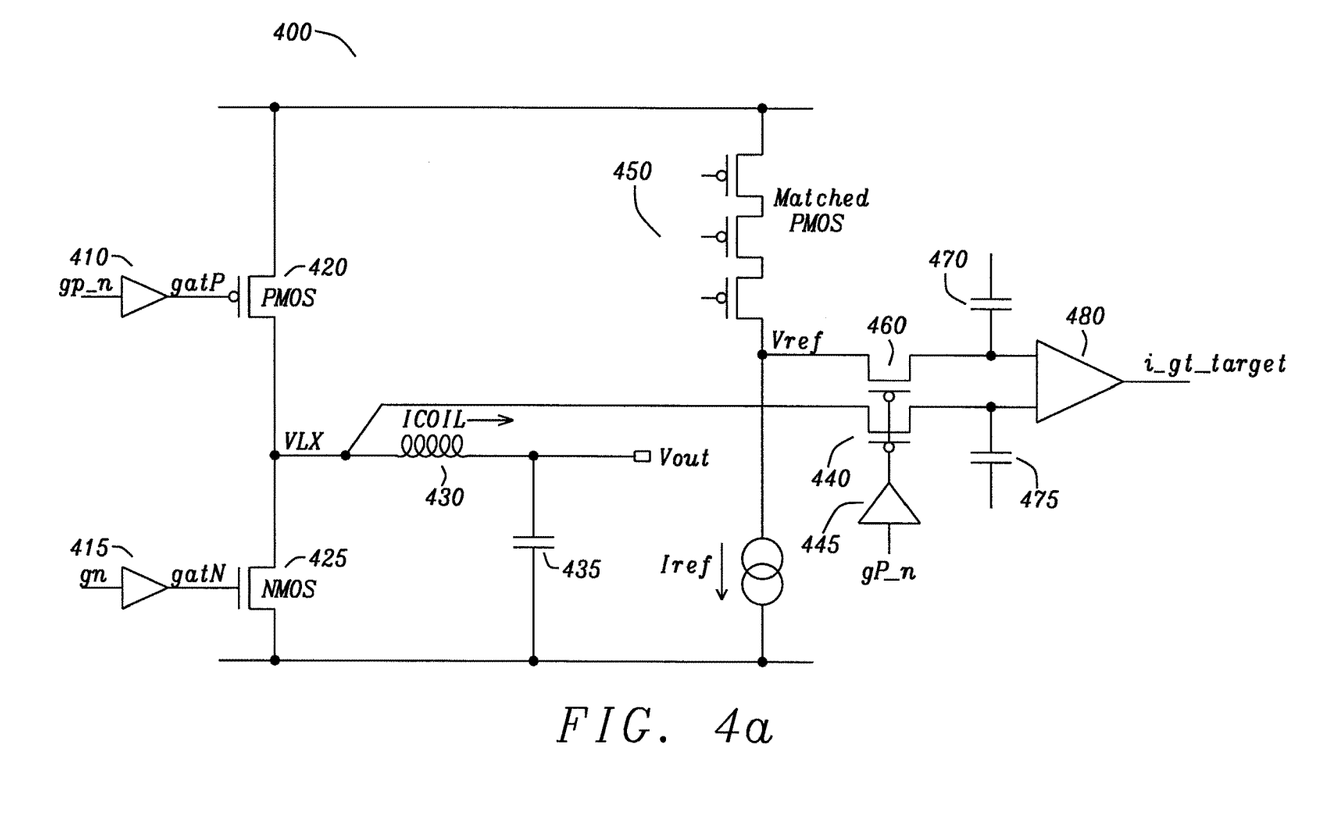
FIG. 4a is a circuit diagram illustrating a Buck switching converter implemented with a peak current servo, where sampling and comparing the LX node and reference voltages is achieved, embodying the principles of the disclosure.

FIG. 4a is circuit diagram 400 illustrating a Buck switching converter implemented with a peak current servo, where sampling and comparing the LX node and reference voltages is achieved, embodying the principles of the disclosure. The circuit samples node voltage VLX, and stores output voltage VOUT, across inductor 430, on capacitor 435. Reference voltage VREF is also sampled.

Reference current IREF is drawn through matched PMOS 450, which matches part of the PMOS pass-devices. The reference current generates a voltage drop across the matched devices, which is compared to the voltage drop in high side pass-device 420, turned on with GATP low, and GP_N high, through inverter 410. Sampling switches 440 and 460 are turned on with the same control signal GP_N, through inverter 445. The voltage on VLX will ring and eventually settle. When high side pass-device 420 is turned off by GP_N going low, the sampling switches will also turn off. This will store the final values of VLX and VREF, on sampling capacitors 470 and 475, as inputs to comparator 480. High side device 420 is typically, but not limited to, a PMOS device.

Comparator 480 only samples the final values during low side device 425 on time, to ensure high accuracy and low complexity. The comparator may be of the sense-amplifier type, but is not limited to this type of comparator. Low side device 425 is turned on with GATN high, as determined by GN low, through inverter 415. The comparator determines which voltage is larger, the final node voltage VLX at the end of the high side device on time, or the reference voltage VREF. If VLX is less than VREF, then the current in the PMOS device is greater than IREF and I_GT_TARGET gets set. The output of the comparator determines signal I_GT_TARGET, when the peak coil current ICOIL is greater than the target current limit, as determined by an OTA programmed to a maximum value. Low side device 425 is typically, but not limited to, an NMOS device.

Figure 4B:
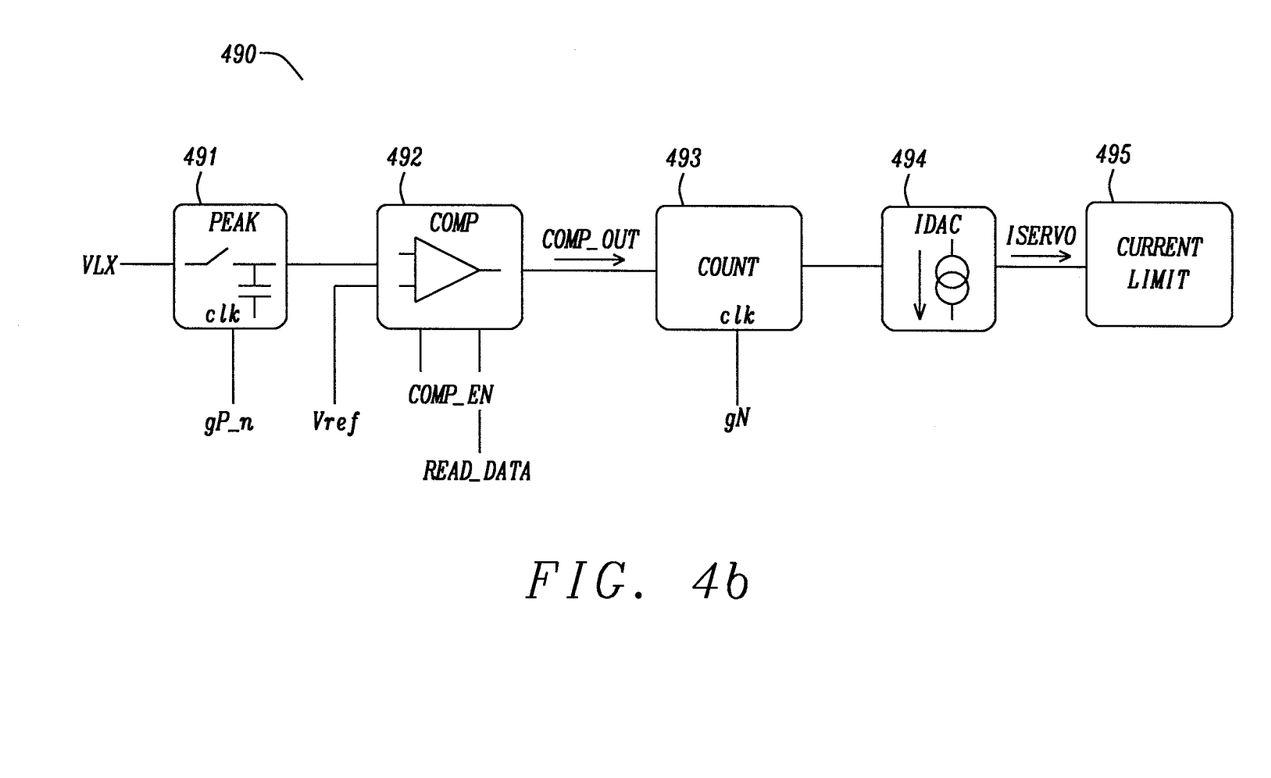
FIG. 4b is a block diagram showing the peak current servo method, implemented with a successive approximation register (SAR) system, embodying the principles of the disclosure.

FIG. 4b is block diagram 490 showing the peak current servo method of circuit 400, implemented with a successive approximation register (SAR) system, embodying the principles of the disclosure. Node Voltage VLX, at the source of high side device 420 and the source of low side device 425, is sampled across switch 440 and capacitor 475, in 491. The sampling is done at the point of peak coil current ICOIL, as high side device 420 turns off with control signal GP_N, through inverter 410. The sampled node voltage is compared to reference voltage VREF, the voltage drop across matched devices 450, in 492, to determine if the peak coil current is higher or lower than the peak target current, as determined by an OTA programmed to a maximum value. The output of comparator 480 determines whether counter 493 increments or decrements each cycle with control signal GN. The output of the counter is used to program the output IDAC current ISERVO 494, to lower the peak-mode current or to raise the valley-mode current, respectively. ISERVO is used to offset the current limit, to remove the effect of the compensation ramp and coil current ripple from the switching converter, in 495.

Figure 4C:
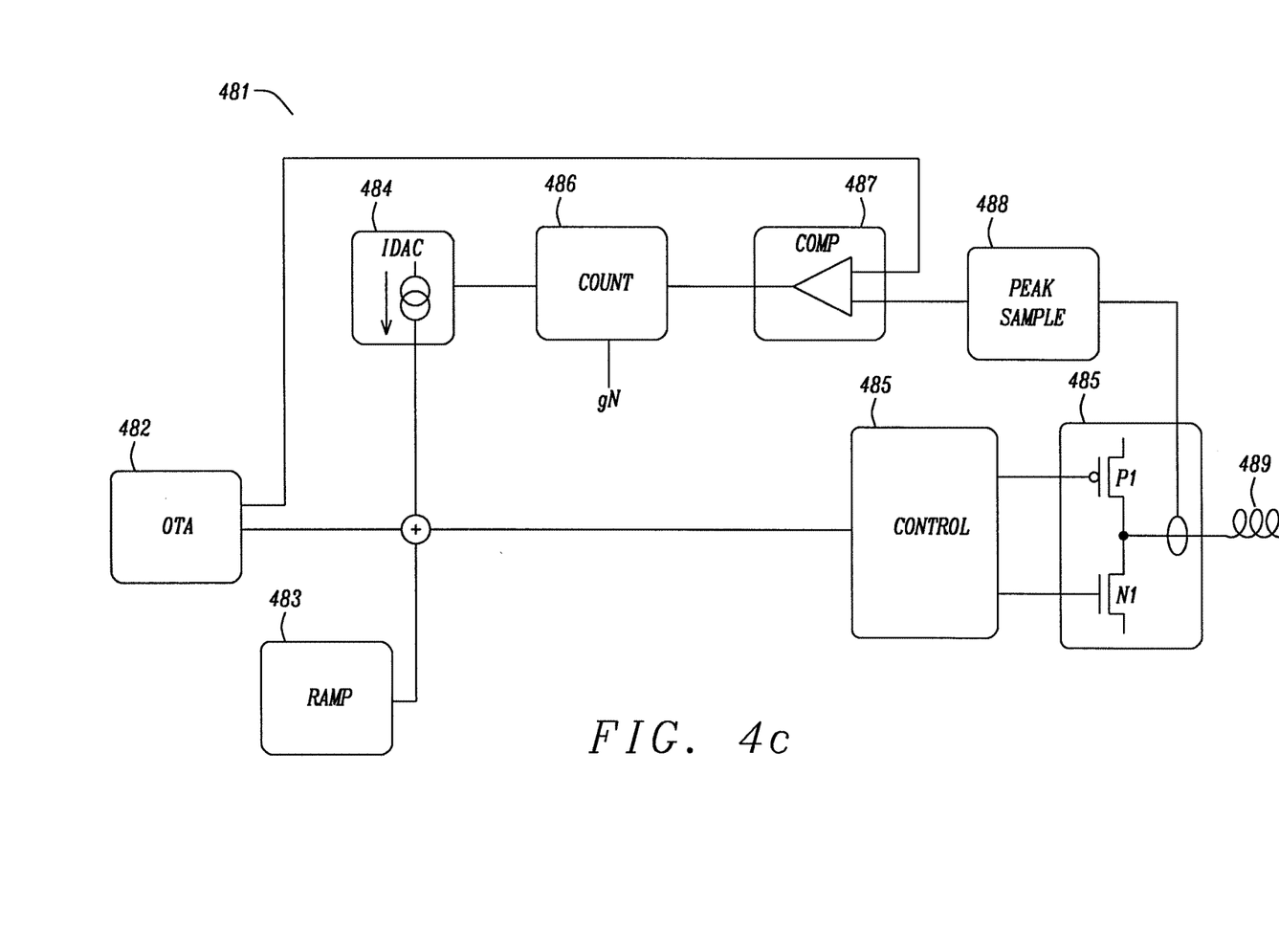
FIG. 4c is a system level diagram of the peak current servo method, embodying the principles of the disclosure.

FIG. 4c is block diagram 481 showing a system level diagram of the peak current servo method, embodying the principles of the disclosure. OTA 482 outputs a current, which is used to control the output current of the switching converter. In order to compensate the switching converter correctly, RAMP 483 current is added to the OTA current. Then to remove the effect of the RAMP, and the peak-to-peak current ripple in the coil, the servo current is also added from IDAC 484. The resulting summed currents is the control current, and input to CONTROL 485, to control the switching of pass-devices P1 and N1.

The servo is then formed from blocks 484, 486, 487, and 488 along the top of block diagram 481. The current is sensed in pass-devices P1 and N1, indicated by the loop around the output wire, across inductor 489. This current is sampled at its peak each cycle, in PEAK SAMPLE 488. This is then compared to the OTA current in COMP 487, and connected to COUNTER 486. The COUNTER then sets the value of the servo current provided by IDAC 484. The loop acts to successively increment or decrement the COUNTER each cycle, until the PEAK SAMPLE matches the OTA current.

Figure 5:
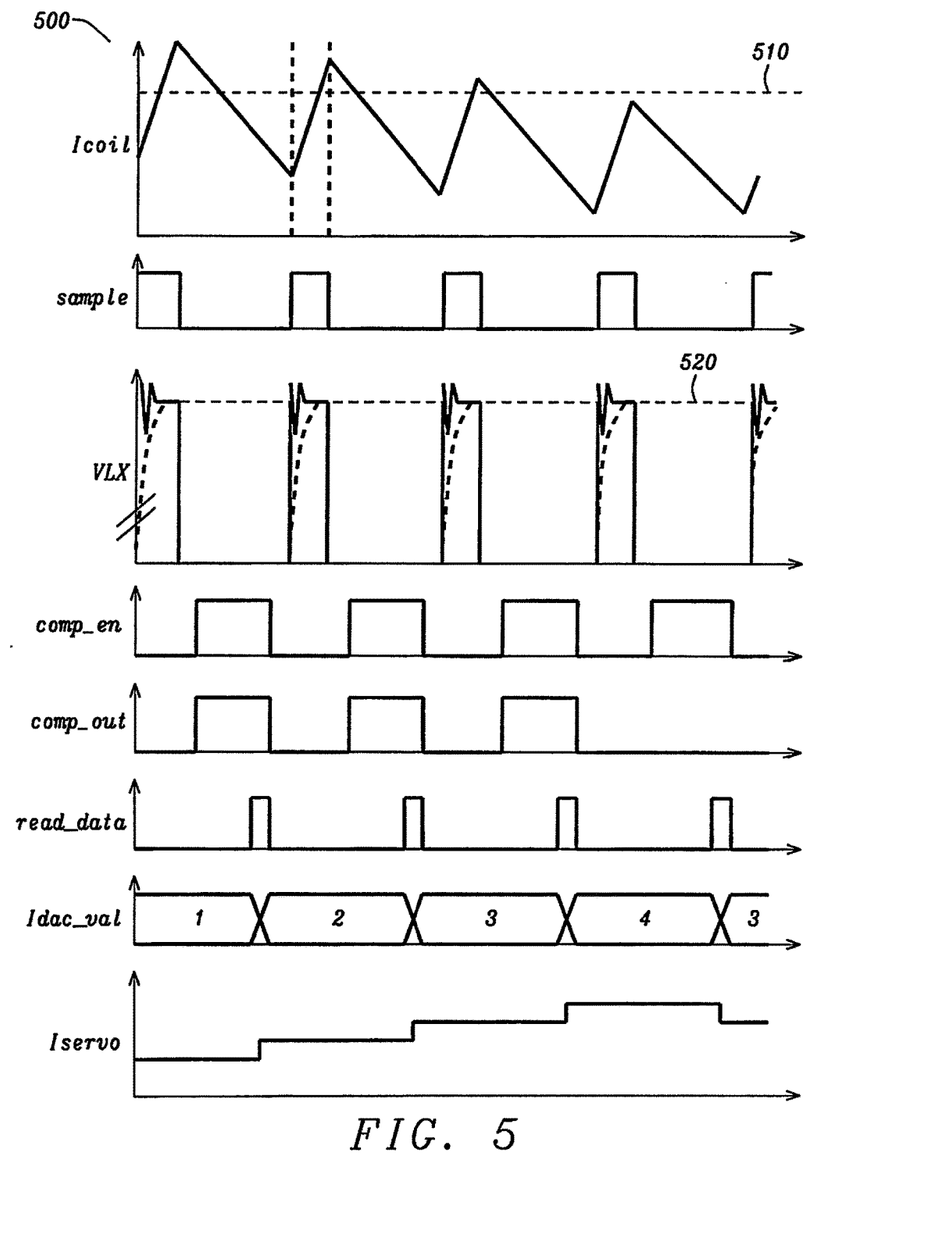
FIG. 5 is a signal diagram illustrating a Buck switching converter with a peak current servo, where the comparator only samples during the low side device on time and the offset of the peak-mode current is slowly modified, embodying the principles of the disclosure.

FIG. 5 is signal diagram 500 illustrating a Buck switching converter with a peak current servo, where the comparator only samples during the low side device on time and the offset of the peak-mode current is slowly modified, embodying the principles of the disclosure. The operation, of the peak current servo, shows coil current ICOIL in relation to target OTA current limit 510. IDAC current output ISERVO 494 is increased cycle-by-cycle, decreasing the coil current until it matches the target.

Node voltage VLX rings when the high side device is first turned on each cycle, and the sampled node voltage takes a few nano-seconds to settle to the correct voltage. Signal SAMPLE illustrates the window where node voltage VLX is sampled with sampling switch 440 onto capacitor 475, and high side device 420 is turned off. When low side device 425 turns on, VLX goes low and sampled voltage 520 is held at its final value, until high side device 420 turns on again.

Comparator enable signal COMP_EN goes high when low side device 425 is on, and sampled node voltage VLX is compared to reference voltage VREF. Comparator output COMP_OUT goes high when peak coil current ICOIL is above target OTA current limit 510 and low when peak coil current ICOIL has been reduced below target OTA current limit 510.

Comparator read signal READ_DATA goes high when the comparator is read, just before low side device 425 is turned off. IDAC_VAL shows the value stored in the control loop counter, and is incremented each cycle when the comparator is high, and decremented each cycle when the comparator is low. Output IDAC current ISERVO controls the offset between target OTA current limit 510, and actual current limit 495.

Figure 6:
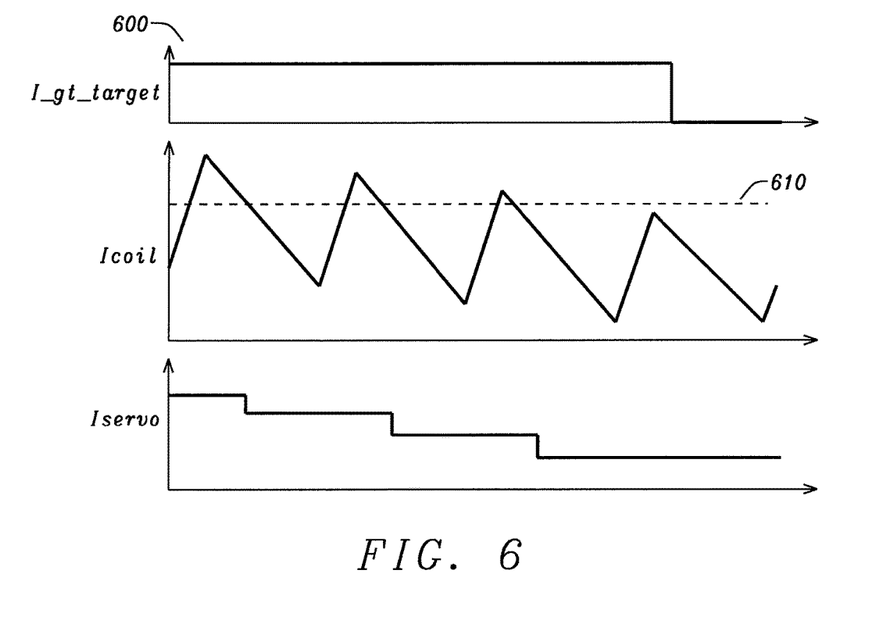
FIG. 6 is a signal diagram illustrating a Buck switching converter with a peak current servo, where the coil current is higher than the nominal limit and the maximum valley-mode current is adjusted down, into the allowed range, embodying the principles of the disclosure.

FIG. 6 is signal diagram 600 illustrating a Buck switching converter with peak current servo, where the coil current is higher than the nominal limit, and maximum valley-mode current is adjusted down into the allowed range, embodying the principles of the disclosure. The circuit of FIG. 4a is implemented to adjust the control current offset, ensuring peak coil current ICOIL matches maximum OTA current limit 610. This takes several cycles to achieve, during which time comparator signal output I_GT_TARGET is on, indicating node voltage VLX is greater than target reference voltage VREF, in the circuit of FIG. 4a. I_GT_TARGET indicates whether a control loop counter increments or decrements each cycle, and the output of the counter is used to program the IDAC current ISERVO. ISERVO offsets the current limit, removing the effect of the compensation ramp and coil current ripple from the switching converter, in cycles to come.

The maximum OTA current is clamped to a programmed value, and if the OTA current is unable to rise above the maximum clamp value, the peak current servo ensures peak coil current ICOIL is unable to rise above the maximum clamp value as well. The effect is to remove the DC effect of the compensation ramp, as well as the duty-cycle dependent error, that presently restrict the accuracy of the OTA current limit in switching converters.

Figure 7:
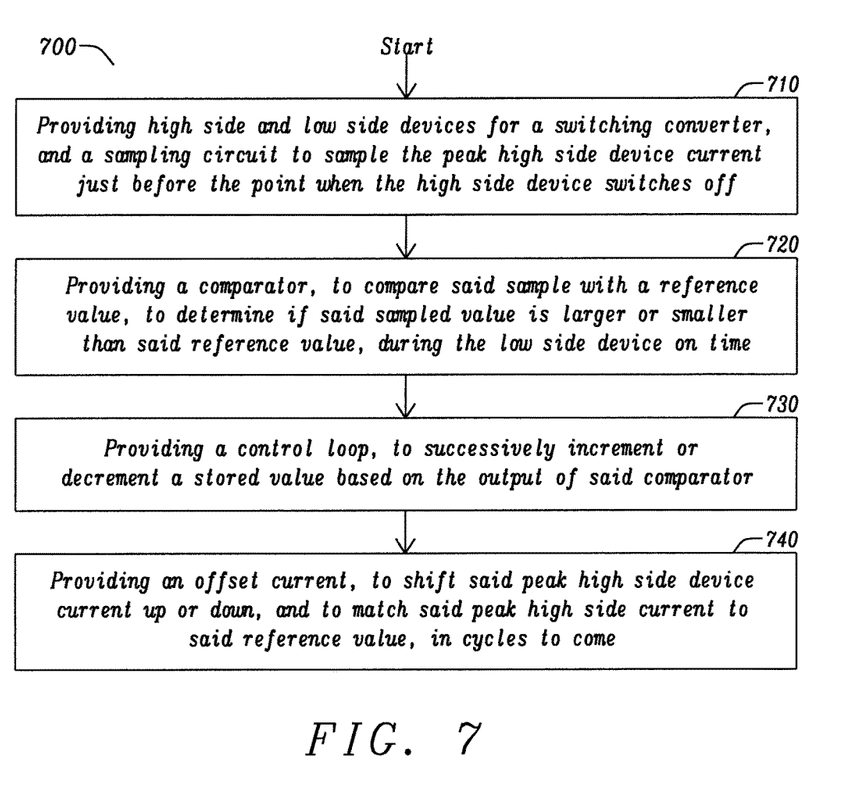
FIG. 7 is a flow chart of a method for a Buck, Boost, or other switching converter implemented with a peak current servo, embodying the principles of the disclosure.

FIG. 7 is flow chart 700 of a method for a Buck, Boost, or other switching converter, implemented with a peak current servo, embodying the principles of the disclosure. Step 710 illustrates a switching converter providing a peak current servo, consisting of high side and low side devices, and a sampling circuit and control loop, sampling the peak high side device current just before the point when the high side device switches off. Step 720 shows a comparator comparing the sampled value with a reference value, to determine if the sampled value is larger or smaller than the reference value, during the low side device on time. Step 730 illustrates a control loop counter, successively incrementing or decrementing a stored value based on the output of the comparator. Step 740 shows an offset signal provided in the control loop, shifting the coil current waveform up or down, matching the peak coil current achieved to the reference current, in cycles to come.

The advantages of one or more embodiments of the present disclosure include combining peak mode monitoring with valley mode control, allowing operation of the coils close to their peak currents. A key feature is to only sample the peak current at the end of the coil charging cycle, allowing the peak current to exceed the limit, because the control loop will modify the valley current in cycles to come. The scheme breaks with previous designs, where the peak current must be limited in real-time in the same cycle. Removing the real-time requirements allows a growth path to higher frequency converters with low Pulse Width Modulation (PWM) duty-cycles.

While this invention has been particularly shown and described with reference to the preferred embodiments thereof, it will be understood by those skilled in the art that various changes in form and details may be made without departing from the spirit and scope of the invention.

The invention claimed is:

1. A peak current servo circuit, comprising:
   high side and low side devices for a switching converter;
   a sampling circuit, configured to sample the peak high side device current just before the point when the high side device switches off;
   a comparator, configured to compare said sample with a reference value, during a low side device on time;
   a control loop, configured to successively increment or decrement a stored value in a counter, based on the output of said comparator;
   wherein said peak current servo circuit is configured to use said stored value to generate an offset current to shift said peak high side device current up or down, and to match said high side device current to said reference value in cycles to come; and
   a plurality of devices matched to said high side device, configured to supply a current for said reference value.

2. The peak current servo circuit of claim 1, wherein said sampling circuit and control loop comprise PMOS pass devices and sampling capacitors.

3. The peak current servo circuit of claim 1, wherein said sampling circuit is configured to store the final values of said peak high side device current, across an inductor, and said reference value, across said plurality of devices matched to said high side device, as inputs to said comparator.

4. The peak current servo circuit of claim 1, wherein said comparator comprises a sense amplifier.

5. The peak current servo circuit of claim 1, wherein said control loop is configured to modify said offset current and to remove the effect of a compensation ramp, in a switching converter.

6. The peak current servo circuit of claim 1, further comprising an operational transconductance amplifier configured for a maximum current clamped to a programmed value, establishing a peak-current limit.

7. The peak current servo circuit of claim 1, wherein said control loop comprises a digital successive approximation register (SAR) system, or using a slow analog control loop.

8. The peak current servo circuit of claim 1, wherein said high side device is PMOS and said low side device is NMOS.

9. The peak current servo circuit of claim 1, wherein said peak current servo circuit is configured to provide peak high side device current in peak-mode switching converters.

10. The peak current servo circuit of claim 1, wherein said peak current servo circuit is configured to remove output current offset in valley-mode switching converters.

11. The peak current servo circuit of claim 1, wherein said peak current servo circuit is configured to implement a peak-current limit in valley-mode converters.

12. A method for peak-mode monitoring with valley-mode control, in a peak current servo circuit, comprising the steps of:
- providing high side and low side devices for a switching converter;
- providing a sampling circuit to sample the peak high side device current just before the point when the high side device switches off;
- providing a comparator, to compare said sample with a reference value, to determine if said sampled value is larger or smaller than said reference value, during the low side device on time;
- providing a control loop, to successively increment or decrement a stored value based on the output of said comparator; and
- providing an offset signal, to shift said peak high side device current up or down, and to match said peak high side device current to said reference value, in cycles to come.

13. The method for peak-mode monitoring with valley-mode control, in the peak current servo circuit of claim 12, wherein said sampling circuit stores the final values of said peak high side device current across an inductor, and said reference value across a plurality of devices matched to said high side device, as inputs to said comparator.

14. The method for peak-mode monitoring with valley-mode control, in the peak current servo circuit of claim 12, wherein said control loop modifies said offset current and removes the effect of a compensation ramp, in a switching converter.

15. The method for peak-mode monitoring with valley-mode control, in the peak current servo circuit of claim 12, wherein an operational transconductance amplifier provides a maximum current clamped to a programmed value, establishing a peak-current limit.

16. The method for peak-mode monitoring with valley-mode control, in the peak current servo circuit of claim 12, wherein said peak current servo circuit provides peak high-side device current in peak-mode switching converters.

17. The method for peak-mode monitoring with valley-mode control, in the peak current servo circuit of claim 12, wherein said peak current servo circuit removes output current offset in valley-mode switching converters.

18. The method for peak-mode monitoring with valley-mode control, in the peak current servo circuit of claim 12, wherein said peak current servo circuit provides a peak-current limit in valley-mode converters.

* * * * *